US009163457B2

(12) United States Patent
Marchand

(10) Patent No.: US 9,163,457 B2
(45) Date of Patent: Oct. 20, 2015

(54) PRESSURE COMPENSATION SYSTEM FOR AN OIL-SEALED MUD MOTOR BEARING ASSEMBLY

(75) Inventor: Nicholas Marchand, Edmonton, CA (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 608 days.

(21) Appl. No.: 12/985,703

(22) Filed: Jan. 6, 2011

(65) Prior Publication Data

US 2012/0177308 A1 Jul. 12, 2012

(51) Int. Cl.

| | |
|---|---|
| ***F16C 17/02*** | (2006.01) |
| ***F16C 43/02*** | (2006.01) |
| ***F16C 33/74*** | (2006.01) |
| ***E21B 4/00*** | (2006.01) |
| ***F04C 2/107*** | (2006.01) |
| ***F03C 2/08*** | (2006.01) |
| ***F04C 13/00*** | (2006.01) |
| ***F04C 15/00*** | (2006.01) |
| ***E21B 4/02*** | (2006.01) |

(52) U.S. Cl.

CPC . *E21B 4/003* (2013.01); *E21B 4/02* (2013.01); *F03C 2/08* (2013.01); *F04C 2/1071* (2013.01); *F04C 13/008* (2013.01); *F04C 15/0061* (2013.01); *Y10T 29/49647* (2015.01)

(58) Field of Classification Search

CPC ...... F16C 17/02; F16C 2352/00; E21B 4/003; E21B 4/02; F04C 13/008; F04C 15/0061

USPC .......................... 384/92–95, 97, 98; 175/107

See application file for complete search history.

(56) References Cited

U.S. PATENT DOCUMENTS

| | | | | |
|---|---|---|---|---|
| 2,646,962 | A | 7/1953 | Wagner | |
| 3,220,496 | A | 11/1965 | Beck | |
| 3,659,662 | A | 5/1972 | Dicky | |
| 4,114,703 | A * | 9/1978 | Matson et al. | 175/107 |
| 4,372,400 | A | 2/1983 | Beimgraben | |
| 4,577,704 | A | 3/1986 | Aumann | |
| 4,613,002 | A | 9/1986 | Pittman et al. | |
| 5,248,204 | A | 9/1993 | Livingston et al. | |
| 5,385,407 | A | 1/1995 | De Lucia | |

(Continued)

OTHER PUBLICATIONS

PCT/US2012/020279 International Search Report and Written Opinion dated May 24, 2013 (12 p.).

(Continued)

*Primary Examiner* — Richard W Ridley
*Assistant Examiner* — Brian McGovern
(74) *Attorney, Agent, or Firm* — Conley Rose, P.C.

(57) ABSTRACT

In an oil-sealed bearing assembly in the bearing section of a mud motor, in which a mandrel is rotatably disposed within a cylindrical housing, a cylindrical sleeve is disposed coaxially and rotatably around the mandrel, with the sleeve being non-rotatably mounted to an inner surface of the housing, thereby forming an annular piston chamber forming part of a generally annular oil reservoir. The sleeve provides radial support to the mandrel along the length of the piston chamber by virtue of the flexural stiffness of the sleeve. The mandrel rotates within the sleeve, with a radial bearing being provided between the sleeve and the mandrel. An annular piston is axially movable within the piston chamber in response to variations in the volume of oil in the reservoir. The piston slides within the piston chamber without rotation relative to either the housing or the sleeve.

20 Claims, 2 Drawing Sheets

(56) References Cited

U.S. PATENT DOCUMENTS

| | | | | |
|---|---|---|---|---|
| 6,250,806 | B1 | 6/2001 | Beshoory et al. | |
| 6,416,225 | B1 | 7/2002 | Cioceanu et al. | |
| 6,568,489 | B1 | 5/2003 | Hailey | |
| 6,742,605 | B2 * | 6/2004 | Martini | 175/57 |
| 2012/0177308 | A1 | 7/2012 | Marchand | |

OTHER PUBLICATIONS

Russian Office Action dated Nov. 27, 2014; Russian Application No. 2013131829 (6 p.).

English Translation of Russian Office Action dated Nov. 27, 2014; Russian Application No. 2013131829 (4 p.).

* cited by examiner

PRESSURE COMPENSATION SYSTEM FOR AN OIL-SEALED MUD MOTOR BEARING ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of the Invention

The invention relates generally to bearing assemblies for mud motors used in drilling of oil, gas, and water wells. More particularly, the invention relates to pressure compensation systems for oil-sealed bearing assemblies.

2. Background of the Technology

In drilling a wellbore into the earth, such as for the recovery of hydrocarbons or minerals from a subsurface formation, it is conventional practice to connect a drill bit onto the lower end of an assembly of drill pipe sections connected end-to-end (commonly referred to as a "drill string"), and then rotate the drill string so that the drill bit progresses downward into the earth to create the desired wellbore. In conventional vertical wellbore drilling operations, the drill string and bit are rotated by means of either a "rotary table" or a "top drive" associated with a drilling rig erected at the ground surface over the wellbore (or, in offshore drilling operations, on a seabed-supported drilling platform or a suitably adapted floating vessel).

During the drilling process, a drilling fluid (also commonly referred to in the industry as "drilling mud", or simply "mud") is pumped under pressure downward from the surface through the drill string, out the drill bit into the wellbore, and then upward back to the surface through the annular space between the drill string and the wellbore. The drilling fluid, which may be water-based or oil-based, is typically viscous to enhance its ability to carry wellbore cuttings to the surface. The drilling fluid can perform various other valuable functions, including enhancement of drill bit performance (e.g., by ejection of fluid under pressure through ports in the drill bit, creating mud jets that blast into and weaken the underlying formation in advance of the drill bit), drill bit cooling, and formation of a protective cake on the wellbore wall (to stabilize and seal the wellbore wall).

Particularly since the mid-1980s, it has become increasingly common and desirable in the oil and gas industry to use "directional drilling" techniques to drill horizontal and other non-vertical wellbores, to facilitate more efficient access to and production from larger regions of subsurface hydrocarbon-bearing formations than would be possible using only vertical wellbores. In directional drilling, specialized drill string components and "bottomhole assemblies" (BHAs) are used to induce, monitor, and control deviations in the path of the drill bit, so as to produce a wellbore of desired non-vertical configuration.

Directional drilling is typically carried out using a "downhole motor" (alternatively referred to as a "mud motor") incorporated into the drill string immediately above the drill bit. A typical mud motor includes several primary components, as follows (in order, starting from the top of the motor assembly):

- a top sub adapted to facilitate connection to the lower end of a drill string ("sub" being the common general term in the oil and gas industry for any small or secondary drill string component);
- a power section comprising a positive displacement motor of well-known type, with a helically-vaned rotor eccentrically rotatable within a stator section;
- a drive shaft enclosed within a drive shaft housing, with the upper end of the drive shaft being operably connected to the rotor of the power section; and
- a bearing section comprising a cylindrical mandrel coaxially and rotatably disposed within a cylindrical housing, with an upper end coupled to the lower end of the drive shaft, and a lower end adapted for connection to a drill bit.

The mandrel is rotated by the drive shaft, which rotates in response to the flow of drilling fluid under pressure through the power section. The mandrel rotates relative to the cylindrical housing, which is connected to the drill string.

In drilling processes using a mud motor, drilling fluid is circulated under pressure through the drill string and back up to the surface as in conventional drilling methods. However, the pressurized drilling fluid exiting the lower end of the drill pipe is diverted through the power section of the mud motor to generate power to rotate the drill bit.

The bearing section must permit relative rotation between the mandrel and the housing, while also transferring axial thrust loads between the mandrel and the housing. Axial thrust loads arise in two drilling operational modes: "on-bottom" loading, and "off-bottom" loading. On-bottom loading corresponds to the operational mode during which the drill bit is boring into a subsurface formation under vertical load from the weight of the drill string, which in turn is in compression; in other words, the drill bit is on the bottom of the wellbore. Off-bottom loading corresponds to operational modes during which the drill bit is raised off the bottom of the wellbore and the drill string is in tension (i.e., when the bit is off the bottom of the wellbore and is hanging from the drill string, such as when the drill string is being "tripped" out of the wellbore, or when the wellbore is being reamed in the uphole direction). This condition occurs, for instance, when the drill string is being pulled out of the wellbore, putting the drill string into tension due to the weight of drill string components. Tension loads across the bearing section housing and mandrel are also induced when circulating drilling fluid with the drill bit off bottom, due to the pressure drop across the drill bit and bearing assembly Accordingly, the bearing section of a mud motor must be capable of withstanding thrust loads in both axial directions, with the mandrel rotating inside the housing. A mud motor bearing section may be configured with one or more bearings that resist on-bottom thrust loads only, with another one or more bearings that resist off-bottom thrust loads only. Alternatively, one or more bi-directional thrust bearings may be used to resist both on-bottom and off-bottom loads. A typical thrust bearing assembly comprises bearings (usually but not necessarily roller bearings contained within a bearing cage) disposed within an annular bearing containment chamber.

Bearings contained in the bearing section of a mud motor may be either oil-lubricated or mud-lubricated. In an oil-sealed bearing assembly, the bearings are located within an oil-filled reservoir in an annular region between the mandrel and the housing, with the reservoir being defined by the inner surfaces of the housing and the outer surface of the mandrel, and by sealing elements at each end of the reservoir. Because of the relative rotation between the mandrel and the housing, these sealing elements must include rotary seals.

Mud motor bearing sections also include multiple radial bearings to maintain coaxial alignment between the mandrel and the bearing housing. In an oil-sealed assembly, the radial bearings can be provided in the form of bushings disposed in an annular space between the inner surface of the housing and the outer surface of the mandrel. It is desirable to maximize radial support for the mandrel in order to maximize the mandrel's resistance to flexural stresses induced when drilling non-straight wellbores.

An oil-sealed bearing assembly must incorporate pressure compensation means, whereby the volume of the annular oil reservoir is automatically adjusted to compensate for changes in oil volume due to temperature changes. In addition, certain types of elastomeric rotary seals (such as KALSI SEALS®) are designed to slowly pump oil underneath the seal interface, and this causes a gradual reduction in oil volume which also must be compensated for. For optimum performance of the rotary seal, it is ideal for the sealing surface of the mandrel to be as wear-resistant as possible, while having a very fine surface finish.

A common method of providing pressure compensation in an oil-sealed bearing assembly uses an annularly-configured piston disposed within an annular region (or "piston chamber") between the housing and mandrel. The outer diameter (O.D.) of the piston is sealed against the inner bore of the housing (by means of one or more sliding seals, such as O-rings), and also may incorporate anti-rotation seals to ensure that the piston does not rotate relative to the housing. The inner diameter (I.D.) of the piston is sealed against the mandrel by means of a rotary seal, which rotates relative to the mandrel during operation, and also slides axially along the mandrel as the piston moves. The rotary seal and sliding seals associated with the piston thus define the upper end of the oil reservoir within the bearing assembly.

A sufficient length of the mandrel below the piston's initial position must remain uninterrupted to accommodate the piston travel that will occur as oil volume varies over time (whether due to temperature change or oil loss). The housing bore must be similarly uninterrupted along this length, forming a cylindrical oil reservoir. The uppermost radial support is thus located at a point below the oil reservoir. Therefore, a significant length of the mandrel in a conventional oil-sealed mud motor bearing section is not radially supported.

Alternatively, radial support for the mandrel may be provided to some extent by the pressure-compensating piston itself. However, the length of radial support is limited to the length of the piston (which desirably should be minimized), and the mandrel will still be unsupported along the length of the oil reservoir (said length of which will be greatest when the oil reservoir is full and the piston is at its uppermost position).

For optimum performance of the rotary seal, it is ideal for the sealing surface of the mandrel to be as wear-resistant as possible, with a very fine surface finish. This is typically provided through the use of a surface treatment such as an abrasion-resistant, diamond-ground coating. To accommodate axial translation of the piston within the piston chamber, the surface treatment of the mandrel needs to be provided over a length corresponding to at least the range of travel of the piston's rotary seal, and preferably the full length of the piston chamber.

Accordingly, there remains a need in the art for a pressure compensation system for oil-sealed mud motor bearing assemblies that provides radial support for the portion of the mandrel corresponding to the stroke of the pressure-compensating piston. Embodiments disclosed herein are directed to these needs.

BRIEF SUMMARY OF THE DISCLOSURE

In accordance with at least one embodiment disclosed herein, a cylindrical sleeve is mounted, internally and coaxially, within the cylindrical housing of an oil-sealed bearing assembly in a mud motor, such that the sleeve is non-rotatable relative to the housing, and such that a cylindrical chamber is formed between the O.D. of the sleeve and the I.D. of the housing. The mandrel of the bearing assembly rotates coaxially within the sleeve, with suitable bearing means (such as a bushing) disposed between the I.D. of the sleeve and the O.D. of the mandrel. The sleeve effectively provides radial support to the corresponding length of the mandrel by virtue of the sleeve's flexural stiffness, such that flexural stresses induced in the mandrel during well-drilling operations will be less than they would be in a bearing assembly not having the radial support sleeve.

The above-noted cylindrical chamber between the O.D. of the radial support sleeve and the I.D. of the housing forms part of a generally annular oil reservoir in which one or more oil-lubricated thrust bearings are disposed. An annularly-configured pressure-balancing piston is disposed within the cylindrical chamber, and is axially movable within the chamber in response to variations in the volume of oil in oil reservoir. Because the radial support sleeve is non-rotating relative to the housing, the piston simply slides within the cylindrical chamber, and therefore can use simple sliding seals rather than rotary seals, which are generally more costly and susceptible to wear than non-rotary seals. As well, there is no need to provide the piston with anti-rotation seals, thus considerably reducing the seal friction that must be overcome as the piston translates during compensation. Accordingly, in addition to providing radial support for the mandrel along the length of the cylindrical chamber (unlike in conventional oil-sealed bearing assemblies), the radial support sleeve provides the significant further benefit of eliminating the need for rotary seals in the pressure-balancing piston. Instead, the upper rotary seal for the oil reservoir is housed in a fixed location within the housing rather than being associated with the piston, such that it does not translate during operation. Therefore, the length of the mandrel requiring wear-resistant surface treatment for the rotary seal can be kept to a minimum, resulting in significant cost savings.

Accordingly, at least one embodiment disclosed herein teaches an oil pressure compensation system for a mud motor bearing section, where the pressure compensation system comprises:

- a cylindrical sleeve coaxially and rotatably disposable around an outer cylindrical surface of the mandrel of the bearing section in a region above the bearing chamber, in conjunction with a radial bearing disposed between the inner surface of the sleeve and the outer cylindrical surface of the mandrel, with the sleeve being non-rotatably connectable to the housing to form a cylindrical piston chamber between the outer surface of the sleeve and an inner surface of the housing; and
- an annularly-configured piston disposable within the piston chamber, such that the piston is axially and non-rotatingly movable within the piston chamber, with the inner and outer faces of the piston sealingly engageable, respectively, with the outer surface of the sleeve and the inner surface of the housing.

In another aspect, at least one embodiment disclosed herein teaches a bearing section for a mud motor, where the bearing section comprises:

an elongate mandrel rotatably and coaxially disposed within an elongate cylindrical housing, with the mandrel having an outer surface, and the housing having an inner surface;

an annular oil reservoir bounded by the outer surface of the mandrel and the inner surface of the housing, and extending between upper and lower rotary seals between the mandrel and the housing, a portion of said oil reservoir defining an annular bearing chamber;

a cylindrical sleeve having inner and outer cylindrical surfaces, with the sleeve being coaxially and rotatably disposed around an outer cylindrical surface of the mandrel in a region above the bearing chamber, in conjunction with a radial bearing disposed between the inner surface of the sleeve and the outer cylindrical surface of the mandrel, with the sleeve being non-rotatably mounted to the housing to form a cylindrical piston chamber between the outer surface of the sleeve and an inner surface of the housing; and an annularly-configured piston disposed within the piston chamber, with the piston being axially and non-rotatingly movable within the piston chamber, and with the piston having inner and outer faces sealingly engageable, respectively, with the outer surface of the sleeve and the inner surface of the housing.

In a further aspect, at least one embodiment disclosed herein teaches a method of providing increased radial support for a mandrel rotatable within the cylindrical housing of a mud motor bearing section having a bearing chamber, where the method comprises the steps of:

providing a cylindrical sleeve having inner and outer cylindrical surfaces; and mounting the sleeve coaxially and rotatably around an outer cylindrical surface of the mandrel in a region above the bearing chamber, in conjunction with a radial bearing disposed between the cylindrical inner surface of the sleeve and an outer cylindrical surface of the mandrel, and with the sleeve being non-rotatable relative to the housing.

Thus, embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings, in which numerical references denote like parts, and in which.

DETAILED DESCRIPTION OF SOME OF THE PREFERRED EMBODIMENTS

Figure 1:
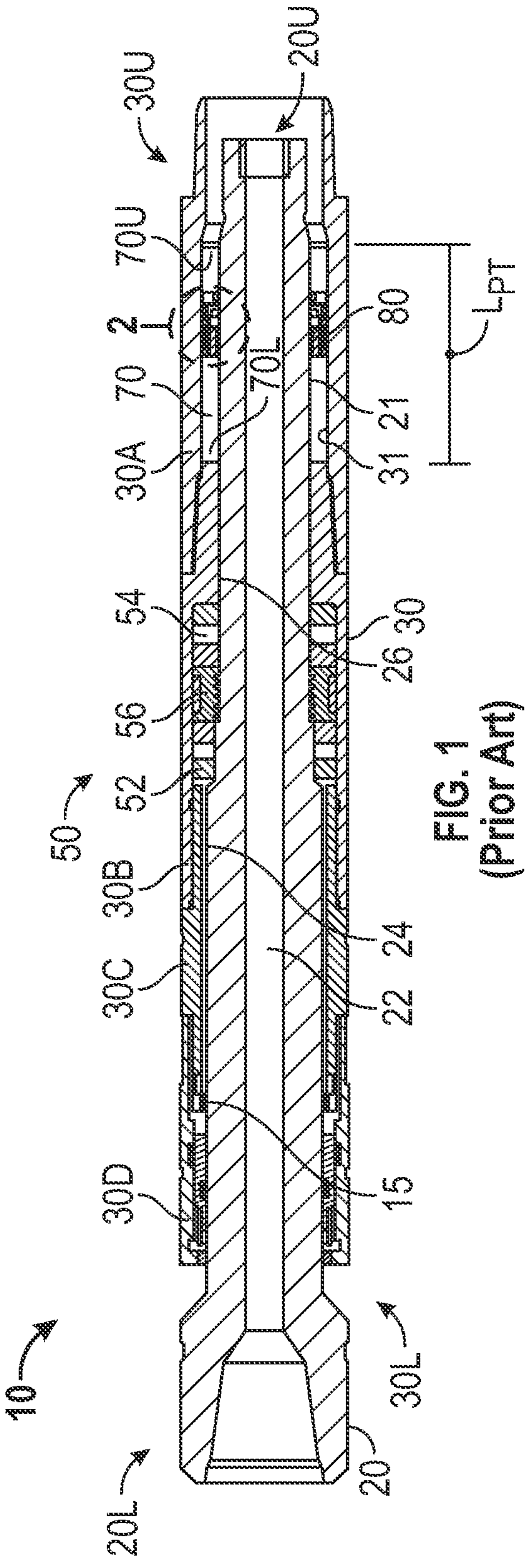
FIG. 1 (Prior Art)
FIG. 1 is a longitudinal cross-section through the bearing section of a prior art mud motor.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Any use of any form of the terms "connect", "mount", "engage", "couple", "attach", or any other term describing an interaction between elements is not meant to limit the interaction to direct interaction between the subject elements, and may also include indirect interaction between the elements such as through secondary or intermediary structure. Relational terms such as "parallel", "perpendicular", "coincident", "intersecting", and "equidistant" are not intended to denote or require absolute mathematical or geometrical precision. Accordingly, such terms are to be understood as denoting or requiring substantial precision only (e.g., "substantially parallel") unless the context clearly requires otherwise.

Figure 2:
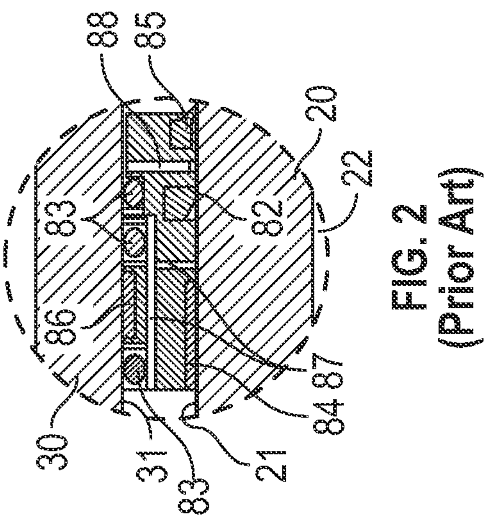
FIG. 2 (Prior Art)
FIG. 2 is an enlarged detail of the pressure-compensating piston of the prior art bearing section shown in FIG. 1.

FIG. 1 illustrates a typical oil-sealed bearing assembly in the bearing section 10 of a prior art mud motor, and FIG. 2 illustrates the pressure-compensating piston 80 of the prior art assembly. Bearing section 10 includes a mandrel 20 having an upper end 20U, a lower end 20L, and a central bore 22 through which drilling fluid can be pumped down to a drill bit (not shown) connected directly or indirectly to lower end 20L of mandrel 20. Mandrel 20 is coaxially and rotatably disposed within a cylindrical housing 30, which typically will be made up of multiple subsections (such as 30A, 30B, 30C, 30D in FIG. 1) threaded together. Housing 30 has a first or upper end 30U adapted for connection to the lower end of the drive shaft housing (not shown) of the mud motor, and a second or lower end 30L (through which lower end 20L of mandrel 20 projects). Upper end 20U of mandrel 20 is adapted for connection to the drive shaft (not shown) of the mud motor, such that the drive shaft will rotate mandrel 20 within and relative to housing 30. In the illustrated assembly, a lower rotary seal 15 is provided between mandrel 20 and housing 30 near the lower end of subsection 30C of housing 30.

In the illustrated prior art bearing section 10, a bearing assembly 50 is disposed within an annular bearing chamber between mandrel 20 and housing 30, at roughly mid-length of bearing section 10. For illustration purposes, bearing assembly 50 is shown as comprising a lower bearing 52 (with associated bearing races) for resisting off-bottom thrust loads; an upper bearing 54 (with associated bearing races) for resisting on-bottom thrust loads; and a split ring 56 mounted to mandrel 20 to provide load-transferring shoulders for transferring thrust loads to bearings 52 and 54. However, the structural and operational details of bearing assembly 50 are not directly relevant to embodiments of the present invention, and therefore are not described in further detail in this patent specification. Between bearing assembly 50 and lower end 30L of housing 30, a lower radial bearing (shown in the form of a lower bushing 24) is provided in an annular space between mandrel 20 and housing 30, to provide radial support to mandrel 20 as it rotates within housing 30.

Referring now to FIGS. 1 and 2, in a region above bearing assembly 50, a cylindrical piston chamber 70 is formed between the outer cylindrical surface 21 of mandrel 20 and the inner cylindrical surface 31 of housing 30. An annular piston 80 is disposed within cylindrical piston chamber 70, and is axially and bi-directionally movable therein. Piston 80 typically is non-rotatable relative to housing 30, while upper end 20U of mandrel 20 rotates relative to piston 80 and housing 30. Accordingly, piston 80 carries a rotary seal 82 to seal piston 80 relative to mandrel 20 as piston 80 moves axially within cylindrical piston chamber 70 and as mandrel 20 rotates within and relative to piston 80. The upper end of piston 80 also carries a wiper seal 85 which engages outer surface 21 of mandrel 20. Piston 80 is also shown with a bushing 84 engaging outer surface 21 of mandrel 20, and multiple sliding seals 83 engaging inner surface 31 of housing 30. Optionally, piston 80 may also have an outer bushing 86 engaging inner surface 31 of housing 30, as shown in FIG. 2. A generally annular oil reservoir is thus formed between lower rotary seal 15, piston 80 (with its associated seals), outer surface 21 of mandrel 20, and inner surface 31 of housing 30, and includes piston chamber 70 and the bearing chamber associated with bearing assembly 50. As seen in FIG. 2, piston 80 may have one or more oil channels 87 and mud channels 88 for distributing oil and drilling mud (respectively) between the inner and outer surfaces of piston 80, to prevent hydraulic pressure locking between pairs of seals.

Piston chamber 70 has an upper end 70U and a lower end 70L, defining a piston travel length $L_{PT}$ through which piston 80 can travel. An upper radial bearing (shown in the form of an upper bushing 26) is provided in an annular space between mandrel 20 and housing 30 in a region between bearing assembly 50 and lower end 70L of piston chamber 70. However, a portion of mandrel 20 having a length corresponding to piston travel length $L_{PT}$ has no radial support (except to the variable extent of any radial support provided by piston 80).

Figure 3:
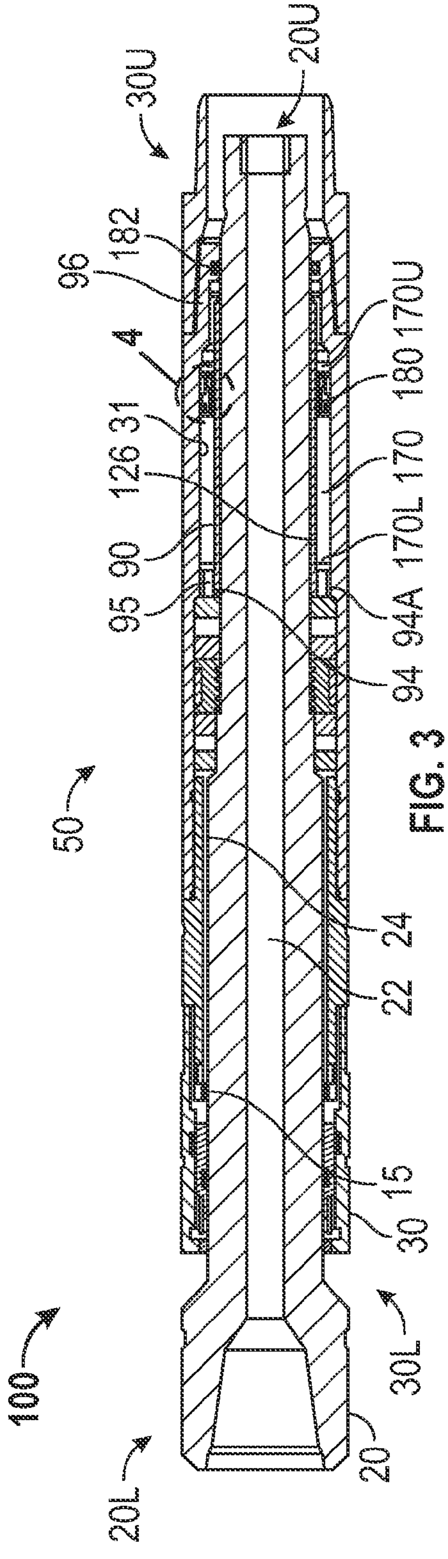
FIG. 3 is a longitudinal cross-section through the bearing section of a mud motor incorporating pressure compensation means in accordance with an embodiment of the present invention.
Figure 4:
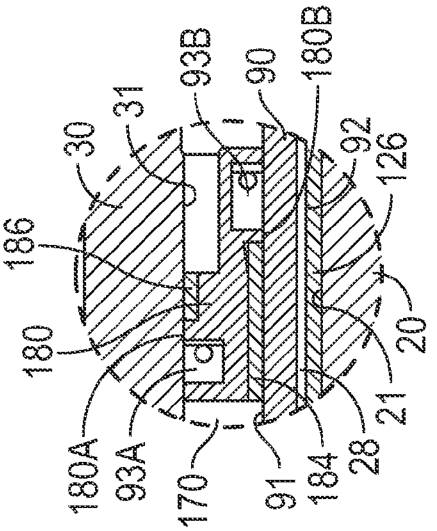
FIG. 4 is an enlarged detail of the pressure-compensating piston of the bearing section shown in FIG. 3.

FIGS. 3 and 4 illustrate a mud motor bearing section 100 incorporating a pressure compensation system in accordance with an embodiment of the present invention. Bearing section 100 includes a mandrel 20, a housing 30, and a lower rotary seal 15, generally as described and illustrated with reference to prior art bearing section 10 in FIG. 1. Bearing section 100 incorporates a bearing assembly 50 disposed within an annular bearing chamber between mandrel 20 and housing 30, at roughly mid-length of bearing section 100. Bearing assembly 50 is shown as being identical to bearing assembly 50 in FIG. 1, but could be of a different configuration in other embodiments. As in prior art bearing section 10, a lower bushing 24 is provided in the annular space between mandrel 20 and housing 30 between bearing assembly 50 and lower end 30L of housing 30, to provide radial support to mandrel 20 as it rotates within housing 30. An upper rotary seal 182 is located within housing 30 (toward upper end 30U thereof) to seal housing 30 relative to mandrel 20 as mandrel 20 rotates within and relative to housing 30.

At a point above (and preferably directly above) bearing assembly 50, a cylindrical sleeve 90 is mounted inside, and coaxial with housing 30, such that sleeve 90 is non-rotatable relative to the housing, and such that an annular piston chamber 170 (with upper end 170U and lower end 170L) is formed between the outer cylindrical surface 91 of sleeve 90 and the inner cylindrical surface 31 of housing 30. In general, sleeve 90 may be non-rotatably mounted to housing 30 in any suitable way known in the art. By way of non-limiting example, this is achieved in the embodiment shown in FIG. 3 by providing the lower end of sleeve 90 with a circular flange 94, projecting radially outward from outer cylindrical surface 91, to facilitate mounting to housing 30, such as by means of a threaded connection represented in FIG. 3 by reference number 94A. One or more oil passages 95 extend axially through flange 94 to allow the flow of oil between piston chamber 170 and bearing assembly 50.

The upper end 96 of sleeve 90 is anchored to housing 30 by any suitably secure means (such as but not limited to friction due to makeup torque applied to threaded connection 94A). An upper bushing 126 is provided in an annular space between the outer cylindrical surface 21 of mandrel 20 and the inner cylindrical surface 92 of sleeve 90, the bushing 126 directly engaging surface 92 and surface 21. This facilitates rotation of mandrel 20 within sleeve 90 (optionally with lubrication channels 28 provided in the inner cylindrical surface 92 of sleeve 90 to allow passage of oil to lubricate bushing 126 and upper rotary seal 182).

An annular pressure-balancing piston 180 is disposed within piston chamber 170, and is axially and bi-directionally movable therein. Piston 180 has an outer face 180A for sliding engagement with inner surface 31 of housing 30 in conjunction with an outer seal 93A, and an inner face 180B for sliding engagement with outer surface 91 of sleeve 90 in conjunction with an inner seal 93B. Since sleeve 90 is non-rotatable relative to housing 30, piston 180 does not rotate relative to both housing 30 and sleeve 90. Accordingly, outer seal 93A and inner seal 93B can be sliding seals (such as O-rings or lip seals) rather than rotary seals.

A generally annular oil reservoir is thus formed between lower rotary seal 15, upper rotary seal 182, piston 90 (with sliding seals 93A and 93B), outer surface 91 of sleeve 90, outer surface 21 of mandrel 20, and inner surface 31 of housing 30, and includes piston chamber 170 and the bearing chamber associated with bearing assembly 50. Piston 180 is also shown with an optional bushing 184 engaging outer surface 91 of sleeve 90 and an optional bushing 186 engaging inner surface 31 of housing 30.

Sleeve 90 effectively provides radial support to the corresponding length of mandrel 20 by virtue of the flexural stiffness of sleeve 90. Furthermore, since piston 180 does not rotate relative to either housing 30 or sleeve 90, rotary seals and anti-rotation seals within piston 180 are unnecessary. Whereas the upper rotary seal 82 in the prior art assembly of FIGS. 1 and 2 translates along mandrel 20 during operation of piston 80, upper rotary seal 182 of the assembly in FIGS. 3 and 4 is housed in a fixed location within housing 30, such that it does not translate during operation of piston 180. Therefore, the length of outer surface 21 of mandrel 20 requiring wear-resistant surface treatment for rotary seal 182 can be kept to a minimum, with resultant cost savings. In addition, and unlike in prior art piston 80 in FIG. 2, piston 180 can use a single upper seal and a single lower seal as shown in FIG. 3, so hydraulic pressure locking is not an issue and it is unnecessary for piston 180 to have to oil channels 87 and mud channels 88 as in piston 80.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:

1. A mud motor bearing section having an upper end and a lower end, the bearing section comprising:

an elongate mandrel rotatably and coaxially disposed within an elongate cylindrical housing having a longitudinal axis, the mandrel having an outer surface, and the housing having an inner surface; and an annular oil reservoir radially disposed between the outer surface of the mandrel and the inner surface of the housing, and extending axially between an upper rotary seal and a lower rotary seal, the upper rotary seal and the lower rotary seal each being radially disposed between the mandrel and the housing, wherein a portion of the oil reservoir defines an annular bearing chamber;

an oil pressure compensation system comprising:

a cylindrical sleeve having an inner cylindrical surface and an outer cylindrical surface, the sleeve being coaxially disposed about an outer cylindrical surface of the mandrel in a region axially above the bearing chamber, and the sleeve being non-rotatably coupled to the housing to form an annular piston chamber between the outer cylindrical surface of the sleeve and an inner cylindrical surface of the housing, wherein the mandrel is configured to rotate relative to the sleeve;

an annular flange disposed at a lower end of the sleeve coupling the sleeve to the housing, wherein the annular flange includes an oil passage configured to allow oil to pass therethrough;

a radial bearing disposed between and directly engaging the inner cylindrical surface of the sleeve and the outer cylindrical surface of the mandrel; and an annular piston non-rotatingly disposed within the piston chamber, wherein the piston is adapted to move axially within the piston chamber, with the piston having an inner face sealingly engaging the outer cylindrical surface of the sleeve, and an outer face sealingly engaging the inner cylindrical surface of the housing.

2. The mud motor bearing section of claim 1, wherein the inner face of the piston carries a non-rotary seal for sealing engagement with the outer cylindrical surface of the sleeve.

3. The mud motor bearing section of claim 1, wherein the outer face of the piston carries a non-rotary seal for sealing engagement with the inner surface of the housing.

4. The mud motor bearing section of claim 1, wherein the flange extends radially outward from the outer cylindrical surface of the sleeve, said flange being adapted for non-rotatable connection to the housing.

5. The mud motor bearing section of claim 1, wherein the radial bearing comprises a bushing.

6. The mud motor bearing section of claim 5, wherein one or more lubrication channels are formed in the inner cylindrical surface of the sleeve.

7. The mud motor bearing section of claim 1, wherein a bushing is provided in association with the inner face of the piston.

8. The mud motor bearing section of claim 1, wherein a bushing is provided in association with the outer face of the piston.

9. A bearing section for a mud motor, the bearing section comprising:

an elongate mandrel rotatably and coaxially disposed within an elongate cylindrical housing having a longitudinal axis, the mandrel having an outer surface, and the housing having a first end, a second end, and an inner surface extending axially between the first end and the second end;

an annular oil reservoir bounded by the outer surface of the mandrel and the inner surface of the housing, and extending axially between an upper rotary seal and a lower rotary seal, wherein the upper rotary seal and the lower rotary seal are each disposed between the mandrel and the housing, a portion of the oil reservoir defining an annular bearing chamber;

a cylindrical sleeve having an inner cylindrical surface and an outer cylindrical surface, the sleeve being coaxially disposed around an outer cylindrical surface of the mandrel in a region completely above the bearing chamber, with the sleeve non-rotatably mounted to the housing to form an annular piston chamber between the outer cylindrical surface of the sleeve and an inner cylindrical surface of the housing, wherein the mandrel is configured to rotate relative to the sleeve;

a radial bearing disposed between and directly engaging the inner cylindrical surface of the sleeve and the outer cylindrical surface of the mandrel; and an annularly-configured piston disposed within the piston chamber, the piston being axially and non-rotatingly movable within the piston chamber, with the piston having an inner face sealingly engageable with the outer cylindrical surface of the sleeve, and an outer face sealingly engageable with said inner cylindrical surface of the housing.

10. The bearing section of claim 9, wherein the inner face of the piston sealingly engages the outer cylindrical surface of the sleeve by means of a non-rotary seal.

11. The bearing section of claim 9, wherein the outer face of the piston sealingly engages the inner cylindrical surface of the housing by means of a non-rotary seal.

12. The bearing section of claim 9, wherein the sleeve has a circular flange projecting radially outward from the sleeve's outer cylindrical surface, said sleeve being non-rotatably connected to the housing.

13. The bearing section of claim 9, wherein the radial bearing comprises a bushing.

14. The bearing section of claim 13, wherein one or more lubrication channels are formed in the inner cylindrical surface of the sleeve.

15. The bearing section of claim 9, wherein a bushing is provided in association with the inner face of the piston.

16. The bearing section of claim 9, wherein a bushing is provided in association with the outer face of the piston.

17. A method of providing increased radial support for an elongate mandrel in association with an elongate mud motor bearing section, the method comprising:

providing a cylindrical sleeve having an upper end, a lower end, an inner cylindrical surface, and an outer cylindrical surface;

mounting the sleeve coaxially around an outer cylindrical surface of the mandrel rotatably and coaxially disposed within an elongate cylindrical housing, said mandrel having an outer surface and said housing having an inner surface, in a region between an annular bearing chamber and an upper rotary seal, said bearing chamber being formed in an annular oil reservoir bounded by the outer surface of the mandrel and the inner surface of the housing and extending between the upper rotary seal and a lower rotary seal between the mandrel and the housing, with the sleeve being non-rotatable relative to the housing and the mandrel being rotatable relative to the sleeve;

coupling the sleeve to the housing with an annular flange disposed at the lower end of the sleeve, wherein the flange includes an oil passage; and providing a radial bearing disposed between and directly engaging the inner cylindrical surface of the sleeve and the outer cylindrical surface of the mandrel.

18. The method of claim 17 wherein the radial bearing comprises a bushing.

19. The method of claim 18 wherein one or more lubrication channels are formed in the inner cylindrical surface of the sleeve.

20. The method of claim 17 wherein a cylindrical piston chamber is formed between the outer cylindrical surface of the sleeve and an inner cylindrical surface of the housing, and wherein the method further comprises the step of providing pressure compensation means comprising an annularly-configured piston disposed within and axially movable within the piston chamber, said piston having an inner face sealingly engageable with the outer cylindrical surface of the sleeve, and an outer face sealingly engageable with said inner cylindrical surface of the housing.

* * * * *